(12) United States Patent
Wolken et al.

(10) Patent No.: US 11,898,568 B2
(45) Date of Patent: Feb. 13, 2024

(54) VARIABLE GEOMETRY TURBINE AND METHOD FOR CALIBRATING A VARIABLE GEOMETRY TURBINE

(71) Applicant: DAF Trucks N.V., Eindhoven (NL)

(72) Inventors: Joep Wolken, Son en Breugel (NL); Bartholomeus Van Grimbergen, Wanssum (NL); Kurt Jean-Marie Dubois, Dilsen-Stokkem (BE)

(73) Assignee: DAF Trucks N.V., Eindhoven (NL)

( * ) Notice: Subject to any disclaimer, the term of this patent is extended or adjusted under 35 U.S.C. 154(b) by 0 days.

(21) Appl. No.: 18/120,668

(22) Filed: Mar. 13, 2023

(65) Prior Publication Data

US 2023/0313808 A1 Oct. 5, 2023

(30) Foreign Application Priority Data

Apr. 1, 2022 (NL) ..................... 2031474

(51) Int. Cl.
*F04D 27/00* (2006.01)
*F02B 37/22* (2006.01)
*F04D 17/10* (2006.01)

(52) U.S. Cl.
CPC ............ *F04D 27/002* (2013.01); *F02B 37/22* (2013.01); *F04D 17/10* (2013.01)

(58) Field of Classification Search
CPC ........ F04D 27/002; F04D 17/10; F02B 37/22; F02B 37/24; F02D 2200/0406; F02D 41/0007; F02D 41/2438; F02D 41/2464; F05D 2220/40; F05D 2260/80; F05D 2260/821; F05D 2270/3011; F05D 2270/44

USPC .......................................... 60/605.1
See application file for complete search history.

(56) References Cited

U.S. PATENT DOCUMENTS

| | | | |
|---|---|---|---|
| 7,593,828 B2 * | 9/2009 | Wang ..................... | F02D 41/22 702/182 |
| 7,689,376 B2 * | 3/2010 | Padhye ............... | F02D 41/0007 702/100 |
| 9,410,475 B2 * | 8/2016 | Morelli ............... | F02D 41/1448 |
| 10,995,684 B1 * | 5/2021 | Lyons ................. | F02D 41/0007 |
| 2008/0295513 A1 * | 12/2008 | Rollinger ............ | F02D 41/0007 60/602 |

(Continued)

OTHER PUBLICATIONS

Dutch Search Report and Written Opinion—App No. 2031474—dated Nov. 24, 2022.

*Primary Examiner* — J. Todd Newton
(74) *Attorney, Agent, or Firm* — Banner & Witcoff, Ltd.

(57) ABSTRACT

A variable geometry turbine (VGT) comprising an intake channel, a rotor, an adjustable nozzle, a nozzle actuator, and a controller. The controller comprises a calibration routine, arranged for calibrating the VGT during normal operation thereof. In the calibration routine, the controller is arranged for performing the steps of:
adjusting the adjustable nozzle from an initial position towards a closed position, while monitoring a pre-turbine pressure;
detecting a deflection point position of the adjustable nozzle at which a sharp difference in the pre-turbine pressure occurs; and
adjusting a minimum cross sectional area in the closed position, to adjust a working range of the VGT in dependence of varying operating conditions, wherein the working range excludes the detected deflection point position.

11 Claims, 6 Drawing Sheets

(56) References Cited

U.S. PATENT DOCUMENTS

| | | | |
|---|---|---|---|
| 2009/0048802 A1* | 2/2009 | Wang | F02D 41/145 |
| | | | 702/138 |
| 2009/0123272 A1 | 5/2009 | Love et al. | |
| 2009/0299673 A1 | 12/2009 | Padhye et al. | |
| 2014/0363278 A1 | 12/2014 | Piper et al. | |
| 2015/0354442 A1* | 12/2015 | Morelli | F02B 37/24 |
| | | | 123/568.16 |
| 2016/0084155 A1 | 3/2016 | Rampone et al. | |

* cited by examiner

VARIABLE GEOMETRY TURBINE AND METHOD FOR CALIBRATING A VARIABLE GEOMETRY TURBINE

CROSS-REFERENCE TO RELATED APPLICATIONS

This application claims priority under 35 U.S.C. § 119 to Application NL 2031474, filed Apr. 1, 2022, which is hereby incorporated by reference in its entirety.

FIELD

The invention relates to a variable geometry turbine and to a method for calibrating a variable geometry turbine.

BACKGROUND

Variable geometry turbines (VGT) can be employed in various applications, such as in commercial vehicles, e.g. to improve the energy efficiency of an internal combustion engine driving such a vehicle. The VGT can extract residual energy from the exhaust gas produced by the engine, which can in turn e.g. be used for powering other components in the vehicle, such as a compressor By improving the energy efficiency, the internal combustion engine and corresponding power train can be downsized without a net reduction in output power. As such, proper implementation of a variable geometry turbine can also lead to improved fuel efficiency and reduced emission of harmful exhaust gases, such as $NO_X$ and $CO_2$.

VGTs typically comprise an adjustable nozzle to regulate the mass flow of exhaust gas to the rotor. At low exhaust mass flows, the adjustable nozzle may for example be narrowed, to adjust the aspect ratio of the turbine by accelerating the mass flow to the rotor. However, by narrowing the adjustable nozzle it forms a venturi, reducing the pressure in the exhaust gas as it passes through the adjustable nozzle. As a result, a suction force is applied between the walls of the thus formed venturi, which may cause the adjustable nozzle to narrow further, thereby effectively closing the VGT and restricting the mass flow significantly. This would, in turn, result in a sharp increase in pre-turbine pressure, which can significantly affect the pumping losses of the engine. To avoid the influence of pressure effects in the low mass flow region, the configuration of a VGT can be adjusted to the properties of the internal combustion engine and exhaust system. Due to part-to-part variations between individual VGTs, however, this means that a significant margin may be used to reduce the sensitivity of VGTs to these pressure effects during use, e.g. due to changing operating conditions or wear of the VGT, engine, or exhaust system. As a consequence of the margin, it may not be possible to utilize the full working range of the VGT, and as such the internal combustion engine may not achieve optimal performance and emissions.

An object of the present invention is to improve the effectiveness of variable geometry turbines, by adjusting their working range based on operating conditions.

SUMMARY

In summary, the invention provides a variable geometry turbine (VGT), comprising an intake channel, a rotor, an adjustable nozzle, a nozzle actuator and a controller. The intake channel is arranged for receiving a mass flow of exhaust gas from an internal combustion engine. The rotor is arranged downstream the intake channel for extracting energy from the mass flow of exhaust gas. The adjustable nozzle comprises a nozzle orifice having an adjustable cross sectional area and arranged for adjusting the mass flow of exhaust gas from the intake channel to the rotor. The adjustable nozzle is adjustable between an open position, in which the nozzle orifice has a maximum cross sectional area, and a closed position, in which the nozzle orifice has a minimum cross sectional area. The nozzle actuator is arranged for actuating the adjustable nozzle between the open position and the closed position, and the controller is arranged for controlling the nozzle actuator based on a nozzle position demand. The controller comprises a calibration routine, arranged for calibrating the VGT during normal operation thereof. In the calibration routine, the controller is arranged for performing the steps of: adjusting the adjustable nozzle from an initial position towards the closed position, while monitoring a pre-turbine pressure measured in the mass flow of exhaust gas upstream the VGT; detecting a deflection point position of the adjustable nozzle at which a sharp difference in the pre-turbine pressure occurs; and adjusting a working range of the nozzle actuator, wherein the minimum cross sectional area in the closed position excludes the detected deflection point position.

Accordingly, the working range of the VGT can be maximized during use, regardless of varying operating conditions, to utilize low exhaust mass flow regions while being less sensitive to the influence of pressure effects in these regions, thereby creating a more predictable exhaust mass flow. By detecting and excluding the deflection point position from the working range, any margin between the deflection point position and the working range of the VGT can be minimized. In this way, performance of the engine can be increased and the emission of harmful exhaust gases, such as $NO_X$, can be reduced.

In some embodiments, the controller is arranged for comparing the detected deflection point position to a stored deflection point position of a pre-calibrated VGT, to determine a deflection point position offset, as a difference between the detected deflection point position and the stored deflection point position. The controller can be arranged for applying the deflection point position offset to the nozzle position demand, so that the difference is applied as a trim to the VGT position demand. This distinguishes from a conventional generic, or average safety margin that can be implemented to cover a large distribution of errors and tolerances between individual VGTs, engines, exhaust systems, and other system components. In contrast, by the applied offset the working range of individual VGTs can be increased, because the safety margin accounting for these variations can be reduced. By determining a deflection point position offset, the working range of an individual VGT can be adjusted with respect to its own respective deflection point position, to avoid the occurrence of the sharp difference in the pre-turbine pressure, without having to implement an average safety margin. In statistical terms this means that the standard deviation between VGTs can be reduced, making it possible to calibrate the mean closer to the optimal deflection point position.

To reduce the effect of measurement errors and dynamic behaviour of components on the detected deflection point position, the controller can be arranged for detecting the deflection point position by monitoring a second derivative of a filtered pre-turbine pressure sensor signal. The second derivative reaches its maximum precisely when there is a strong deviation from a smooth characteristic, which can be used to detect the deflection point position.

The present invention is applicable to various types of actuators, such as hydraulic, pneumatic or electric actuators. As such the VGT is compatible with the most common designs of actuators. Preferably, the controller is arranged for controlling the nozzle actuator to adjust the adjustable nozzle based on the measured pre-turbine pressure, to counteract external forces on the VGT.

In some embodiments, the intake channel is arranged for providing the mass flow of exhaust gas to the rotor in a direction substantially perpendicular to an axis of rotation of the rotor. As such, a radial variant of the rotor is provided, which receives the mass flow of exhaust gas from a radial direction and discharges the mass flow of exhaust gas in an axial direction. The present invention may however also be suitable for other variants of rotor designs, such as axial variants, in which the intake channel is arranged for providing the flow of exhaust gas to the rotor along the axis of rotation of the rotor.

To increase the efficiency of the VGT and accelerate the mass flow of exhaust gas, the intake channel can be formed as a volute that is coaxially aligned with the rotor.

In one embodiment, the adjustable nozzle comprises a slidable element. The element is slidable by the nozzle actuator to close the intake channel. Alternatively, the VGT may also be compatible with adjustable nozzle designs that comprise rotatable or pivotable vanes.

Another aspect of the invention relates to a commercial vehicle, comprising a variable geometry turbine as described herein.

Yet other aspects pertain to a method for calibrating a variable geometry turbine (VGT). The VGT comprises an intake channel, a rotor, and an adjustable nozzle. The intake channel is arranged for receiving a mass flow of exhaust gas from an internal combustion engine. The rotor is arranged downstream the intake channel for extracting energy from the mass flow of exhaust gas. The adjustable nozzle comprises a nozzle throat having an adjustable cross sectional area arranged for adjusting the mass flow of exhaust gas from the intake channel to the rotor, wherein the adjustable nozzle is adjustable between an open position, in which the nozzle throat has a maximum cross sectional area, and a closed position, in which the nozzle throat has a minimum cross sectional area. The method comprises the steps of: (i) adjusting the adjustable nozzle from an initial position towards the closed position, while monitoring a pre-turbine pressure measured upstream the VGT; (ii) detecting a deflection point position of the adjustable nozzle at which a sharp difference in the pre-turbine pressure occurs; and (iii) adjusting a working range of the nozzle actuator, having an adjusted minimum cross sectional area in the closed position that excludes the detected deflection point position.

BRIEF DESCRIPTION OF THE DRAWINGS

The invention will be further elucidated in the figures.

DETAILED DESCRIPTION

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1:
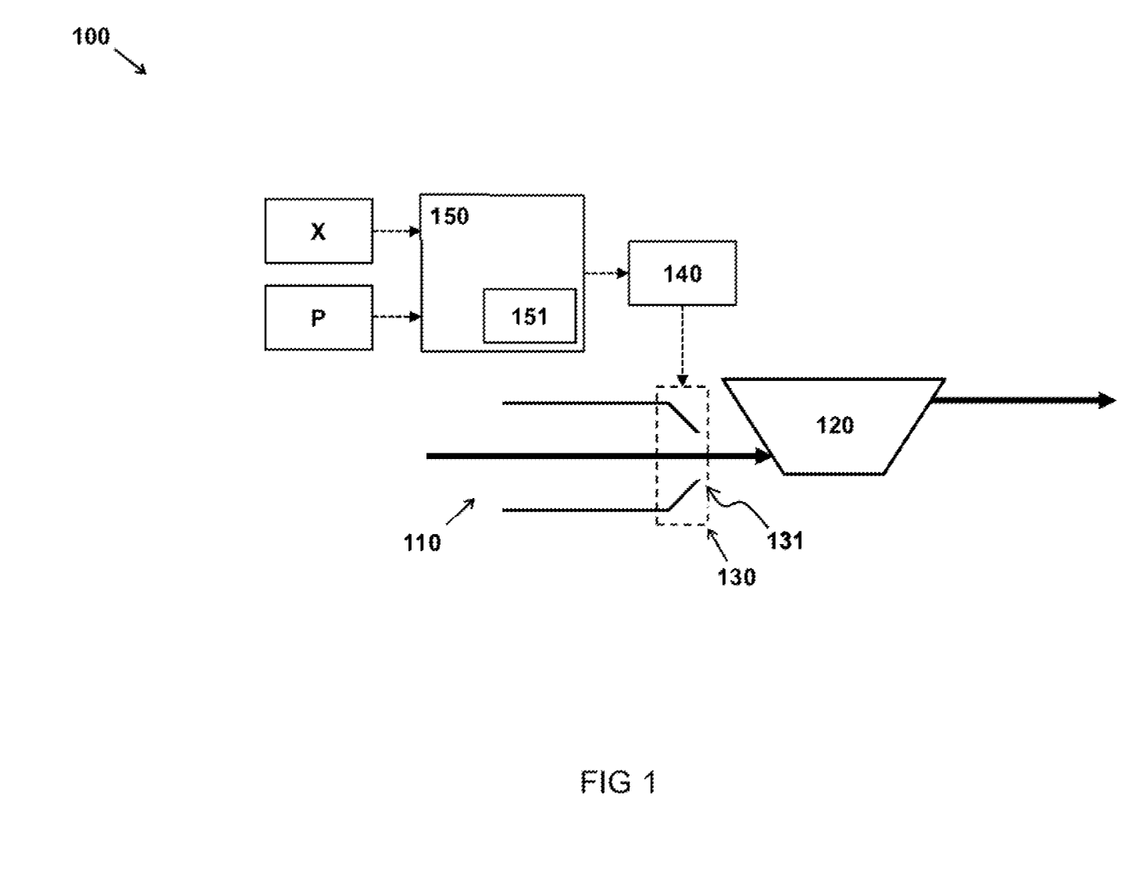
FIG. 1 illustrates an embodiment of a VGT.

FIG. 1 illustrates an embodiment of a variable geometry turbine, VGT 100, e.g. suitable for automotive applications wherein the VGT is arranged in the exhaust system of an internal combustion engine, such as a diesel or spark ignition engine. The VGT 100 can for example be part of a mechanical turbocharger, to convert energy recovered from exhaust gases into boost pressure. Alternatively, the VGT 100 can for example be used for driving an electric compressor or for driving an electric generator, to convert energy recovered from exhaust gases into electric power, which can e.g. be stored in an electric power source or can be applied directly, to power other components.

The VGT 100 comprises an intake channel 110, arranged for receiving a mass flow of exhaust gas from an internal combustion engine. The VGT 100 may comprise multiple intake channels 110, each arranged for receiving a mass flow of exhaust gas from the internal combustion engine. For example, the intake channel 110 can comprise one or more exhaust gas entry ports, each of which is fluidly connected to one or more exhaust manifolds, which, in turn, are arranged for collecting exhaust gas discharged through exhaust ports on the cylinders of the internal combustion engine.

The VGT 100 further comprises a rotor 120, arranged downstream the intake channel 110 for extracting energy from the mass flow of exhaust gas received from the intake channel 110. The rotor for example comprises blades for converting kinetic and potential energy in the mass flow of exhaust gas into torque to propel a rotor shaft of the VGT, e.g. to power a compressor or an electric generator. The rotor 120 can e.g. be a radial variant, arranged for receiving a mass flow of exhaust gas from a radial direction and discharging the mass flow in an axial direction. Alternatively, the rotor 120 can e.g. be an axial variant, arranged for receiving a mass flow of exhaust gas from an axial direction and discharging the mass flow in a radial direction.

As illustrated in FIG. 1, the VGT 100 comprises an adjustable nozzle 130, comprising a nozzle orifice 131 having an adjustable cross sectional area. The adjustable nozzle 130 is arranged for adjusting the mass flow of exhaust gas from the intake channel 110 to the rotor 120. The adjustable nozzle 130 can e.g. comprise sliding or pivoting vane elements, arranged for narrowing or widening the cross sectional area, in dependence of operating conditions of the VGT. The adjustable nozzle 130 is adjustable between an open position, in which the nozzle orifice 131 has a maximum cross sectional area, and a closed position, in which the nozzle orifice 131 has a minimum cross sectional area.

The VGT 100 further comprises a nozzle actuator 140, arranged for actuating the adjustable nozzle 130 between the open position and the closed position. For example, the VGT 100 may additionally comprise a transmission mechanism arranged for providing a mechanical transmission, e.g. comprising a linkage or a drive train, between the nozzle actuator 140 and the adjustable nozzle 130. Alternatively, the nozzle actuator 140 can be coupled directly to the adjustable nozzle 130. The nozzle actuator 140 can e.g. be a pneumatic actuator, arranged for using a gas, such as air, to actuate the adjustable nozzle 130, e.g. via a transmission mechanism. Alternatively, the nozzle actuator 140 can e.g. be an hydraulic actuator, arranged for using a fluid, such as water or an oil, for actuating the adjustable nozzle 130. Alternatively, the nozzle actuator 140 can e.g. be an electric actuator. Any combinations of the above described types of nozzle actuator 140 may also be suitable for actuating the adjustable nozzle 130, e.g. by using a transmission mechanism.

The VGT 100 further comprises a controller 150. The controller 150 can for example be a processor on board of the VGT. Alternatively, the controller 150 can e.g. be part of a central processing unit or an engine control unit, and communicatively coupled with elements of the VGT. The controller 150 is arranged for controlling the nozzle actuator 140 based on a nozzle position demand, e.g. a nozzle position between the open and closed position, for example based on operating conditions of the VGT such as the pressure upstream and/or downstream the turbine, rotor speed, or power output.

There may be small variations in hardware between individual VGT's, e.g. due to manufacturing and assembly tolerances, deviations in mechanical parts and sensors, and/or wear and degradation of components. Accordingly, the position of the adjustable nozzle 130 at which a VGT is most sensitive to pressure effects in the exhaust system, e.g. a deflection point position of the adjustable nozzle at which a sharp difference in pre-turbine pressure upstream the VGT occurs, may vary between individual VGTs. As a result, a mean deflection point position can be considered, and a safety margin can be implemented to account for variations between VGTs. However, this implies that the working range of some VGTs may be unnecessarily limited, thereby reducing the effectiveness of these VGTs, especially in the low exhaust mass flow region, where the benefits of improved fuel efficiency and reduced emission of harmful exhaust gases are most likely to be obtained.

Instead, according to the invention, to reduce the part-to-part spread between VGTs, and increase the working range of individual VGTs to improve their effectiveness, e.g. in the low exhaust mass flow region, the controller 150 is provided with a calibration routine 151, arranged for calibrating the VGT 100 during normal operation thereof, e.g. during an on-line calibration procedure. For example, while the VGT 100 is in use, such as in a driven commercial vehicle, the controller 150 runs the calibration routine 151 to calibrate the VGT 100, e.g. in dependence of operating conditions of an internal combustion engine powering the commercial vehicle. Because of varying operating conditions the mass flow of exhaust gas supplied to the intake channel 110 of the VGT 100 may change, e.g. in quantity or in pressure. As such, the VGT 100 may need to be calibrated accordingly, by the calibration routine 151, to keep the VGT 100 in an optimal working range. The calibration routine 151 can e.g. be run during stationary operating condition, e.g. when the commercial vehicle is in idle condition. In this case, an internal combustion engine powering the vehicle may be run at a constant speed and/or load to calibrate the VGT across a broad spectrum of operating conditions. The calibration routine 151 can e.g. be arranged to determine the deflection point position during idle condition comprising specific engine modes and/or sensor values, such as a condition in which an exhaust gas recirculation (EGR) valve is closed and a brake pressure valve is opened. Under such conditions, the pre-turbine pressure P upstream the turbine can be maximized while the pressure downstream the turbine is minimalized. Accordingly, the force reversal effect, which causes the sharp difference in the pre-turbine pressure P, can be induced by adjusting the adjustable nozzle 130 towards the deflection point position 155.

In the calibration routine 151, the controller 150 is arranged for controlling the nozzle actuator 140 to adjust the adjustable nozzle 130 from an initial position towards the closed position. The initial position can be set to preference, e.g. to detect a deflection point position 155 over a larger range or to speed up the calibration routine 151. For example, in the initial position the cross sectional area can be between 20% and 50% of the maximum cross sectional area in the open position, e.g. 30% of the maximum cross sectional area. Additionally, the adjustment speed at which the adjustable nozzle is adjusted from the initial position towards the closed position can be set to preference. In this way, the sensitivity of the calibration routine 151 can e.g. be increased or the time to perform the calibration routine 151 can be decreased. For example, the adjustment speed can be between 1% and 10% of the maximum cross sectional area per second, e.g. 2% of the maximum cross sectional area per second. For example, the initial position and the adjustment speed can be set, such that the expected time to perform the calibration routine 151, e.g. from the start of the calibration routine 151 until the detection of the deflection point position 155, is approximately 10 seconds. The calibration routine 151 can for example be performed after (re)assembling or replacing a turbine, or after a predefined time period since completing a previous calibration routine 151.

While adjusting the adjustable nozzle 130, the controller 150 monitors a pre-turbine pressure measured in the mass flow of exhaust gas upstream the VGT 100, e.g. in an exhaust manifold of an internal combustion engine supplying exhaust gas to the intake channel 110 of the VGT 100.

Figure 2:
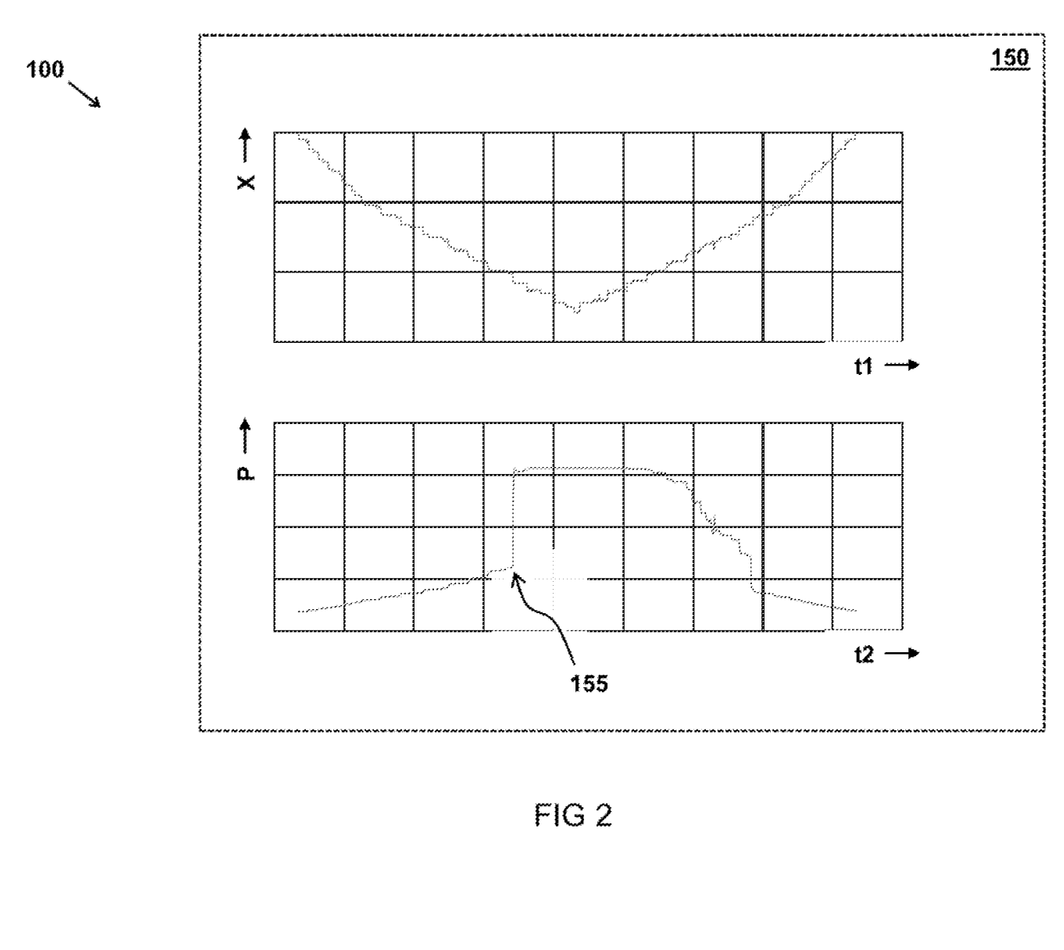
FIG. 2 provides an example of a deflection point position detected by the VGT; VGT.

As illustrated in FIG. 2, the controller 150 can for example be arranged for logging the position X of the adjustable nozzle 130, e.g. by receiving position data from a sensor or encoder that measures the nozzle position X, such as a capacitive sensor, a hall sensor, an LVDT, an optical encoder, etc. Alternatively, the position X of the adjustable nozzle 130 can be derived from a status of the nozzle actuator 140.

The position data obtained can for example be used for determining a zero reference value, e.g. a zero-position, to define the closed position of the adjustable nozzle 130. As such, a change in position of the adjustable nozzle 130 from the zero reference value toward the open position can for example be logged in absolute distance units, such as in millimetres, measured from the closed position. Alternatively, by additionally assigning a reference value to the open position, e.g. when the cross sectional area of the nozzle orifice is at a maximum, the position of the adjustable nozzle 130 can for example be logged in relative units, such as a percentage between the closed and open position, e.g. measured from the closed position, with 0% being fully closed and 100% being fully opened.

The controller 150 may e.g. be arranged for logging the position X of the adjustable nozzle 130 as a function of a first time t1. The controller 150 may e.g. further be arranged for logging the pre-turbine pressure P as a function of a second time t2, wherein the second time t2 is synchronized with the first time t1. Alternatively, or additionally, the controller 150 can e.g. be arranged for logging the pre-turbine pressure P as a function of the position X of the adjustable nozzle 130.

The controller 150 is further arranged, in the calibration routine 151, for performing a step of detecting a deflection point position 155 of the adjustable nozzle at which a sharp difference in the pre-turbine pressure P occurs, as can be seen in FIG. 2. For example, when monitoring the pre-turbine pressure P while adjusting the adjustable nozzle 130 between the open and closed position, the controller 150 may detect a sharp, sudden difference in pre-turbine pressure P. The deflection point position 155 can for example be defined as the position of the adjustable nozzle 130 at which the sharp difference in pre-turbine pressure P starts, when moving the adjustable nozzle 130 from the open position to the closed position.

Figure 3:
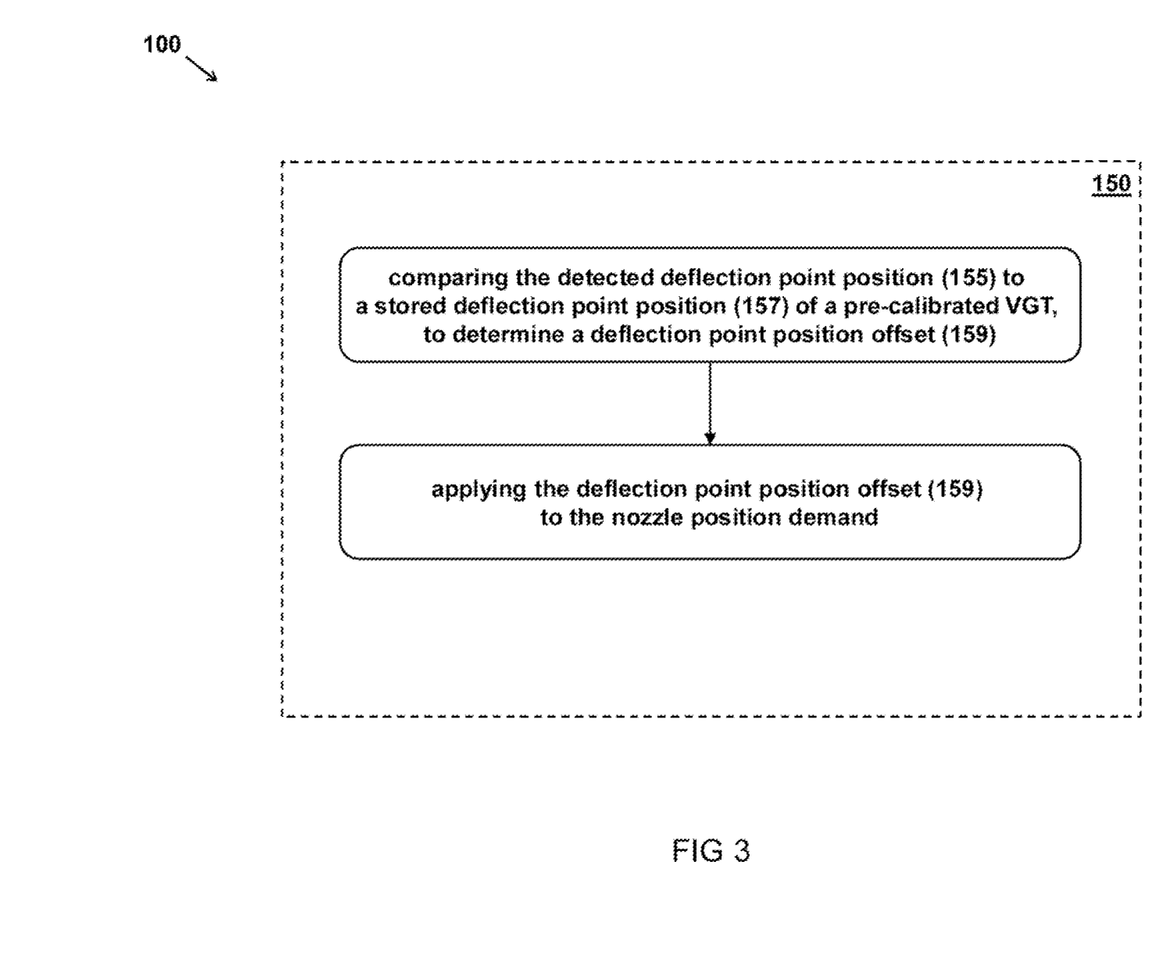
FIG. 3 provides other or further embodiments of a controller of the VGT.

In the calibration routine 151, the controller 150 is further arranged for adjusting the minimum cross sectional area in the closed position. In this way the controller 150 can adjust a working range of the VGT 100, e.g. a range between the open position and the closed position, in dependence of varying operating conditions, such as pre-turbine pressure, rotor speed, power output, etc. The working range excludes the above described detected deflection point position 155, e.g. by (re)defining the closed position of the adjustable nozzle 130, such that the sharp difference in pre-turbine pressure does not occur when moving the adjustable nozzle 130 between the open position and the (re)defined closed position and yet the cross sectional area is minimized respective to the detected deflection point position, so that the minimal cross sectional area can be updated to a smaller value, which is yet sufficiently away from the deflection point position FIG. 3 illustrates another or further embodiment of the VGT 100. Here, the controller 150 is arranged for comparing the detected deflection point position 155 to a stored deflection point position 157 of a pre-calibrated VGT, to determine a deflection point position offset 159. The deflection point position offset can e.g. be determined by performing the calibration routine 151 during idle conditions of the vehicle. In general, the stored deflection point position 157 comprises one entry, associated with a position of the adjustable nozzle at which a sharp difference in the pre-turbine pressure P occurs. In some cases, however, the stored deflection point can comprise more than one entry, wherein each entry is associated with a specific operating condition of the VGT and/or of the internal combustion engine, e.g. to represent different nozzle positions at which a sharp difference in pre-turbine pressure P can occur, depending on the respective operating condition. The entries can for example be stored in a memory accessible by the controller 150, such as from a lookup table.

The controller 150 can be arranged for applying the deflection point position offset 159 to the nozzle position demand. In this way the working range of the VGT 100 can virtually be shifted away from the detected deflection point position 155. This can be used to effectively align the deflection points of individual VGTs, reducing the need for a safety margin in the calibration process.

Preferably, the controller 150 is arranged for detecting the deflection point position 155 by monitoring a second derivative of a filtered pre-turbine pressure sensor signal. Filtering and/or determining the second derivative of the sensor signal can e.g. be performed by the controller 150, or can be performed by another processing unit, such as an engine control unit or sensor processor. By using the second derivative of a filtered signal, the calibration routine 151 can be made less sensitive to high frequency effects e.g. caused by dynamic behaviour of components and/or measurement errors.

Figure 4:
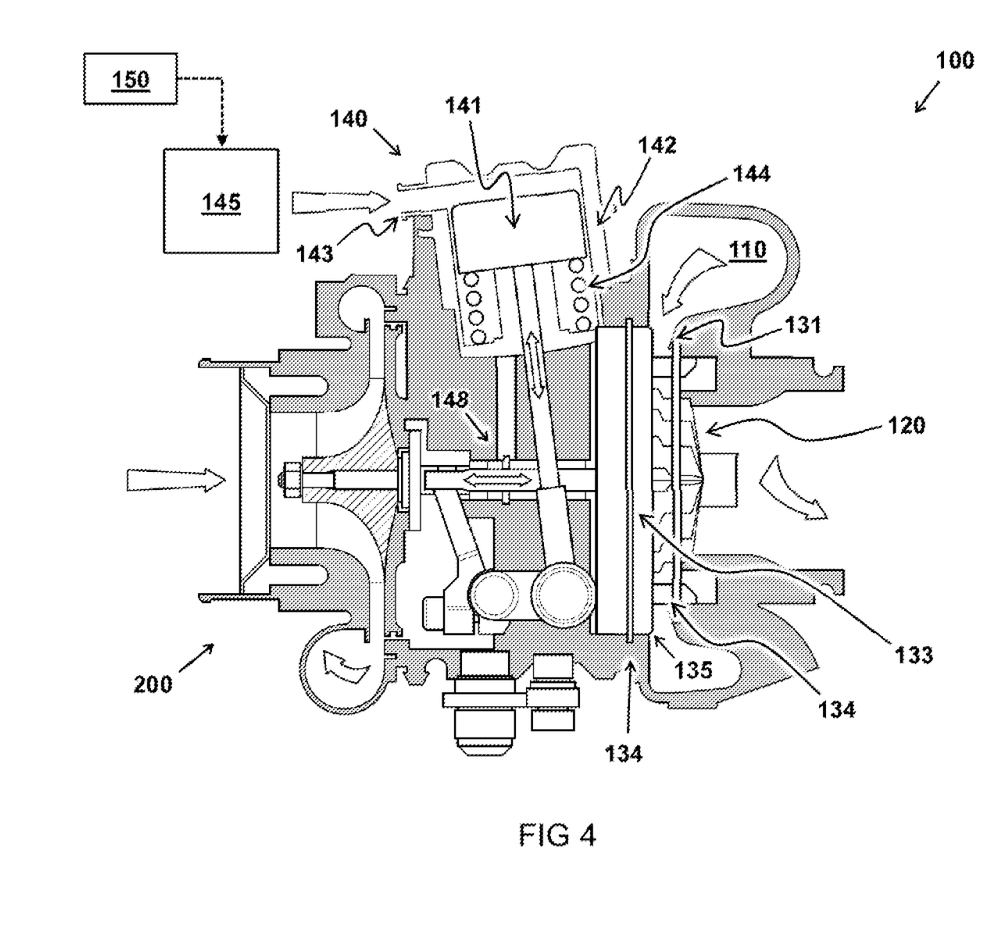
FIG. 4 illustrates another or further embodiment of the VGT.

FIG. 4 illustrates another or further embodiment of the VGT 100, e.g. as part of a turbocharger, wherein the VGT 100 is arranged for driving a compressor 200. In some embodiments of the VGT 100, e.g. as can be seen in FIG. 4, the adjustable nozzle 130 comprises vanes 134 disposed around a circumference of the rotor 120. The vanes may have a flow guiding surface that is arranged for guiding the mass flow of exhaust gas from the intake channel 110 to the rotor 120, e.g. in a tangential direction. The vanes 134 can e.g. form a ring around the rotor 120, and each vane can have a flow guiding surface that is oriented at an angle for guiding the mass flow of exhaust gas. A slidable tube 133 may be coaxially aligned with the rotor 120. The slidable tube 133 may be slidable around the vanes 134, e.g. along a direction parallel to the axis of rotation of the rotor 120, to adjust the flow guiding surface of the vanes 134. For example, the slidable tube 133 may comprise an edge 135 which is slidable towards an opposing wall of the intake channel 120, thereby adjusting the cross sectional area of the nozzle orifice 131, e.g. to open or close the intake channel 120.

The nozzle orifice 131 for example is formed by a gap between the slidable tube 133 and an opposing wall of the intake channel 110. The nozzle actuator 140 can for example be arranged for actuating the slidable tube 133, e.g. by translating the slidable element 133 against the opposing wall. The slidable tube 133 can for example be a cylindrical tube that is coaxially aligned with the rotor 120, with a tube wall that is arranged perpendicular to a direction of the mass flow of exhaust gas from the intake channel. Accordingly, when the nozzle actuator 140 e.g. translates the cylindrical tube to close the intake channel 110, the tube wall reduces the cross sectional area of the nozzle orifice 131.

Around the deflection point position described herein, the edge 135 is near the opposing wall of the intake channel 120. Accordingly, a venturi is formed and the pressure in the mass flow of exhaust gas flowing through the adjustable nozzle is decreased. As a result, the slidable tube 133 is sucked towards the opposing wall of the intake channel and the cross sectional area of the nozzle orifice is further reduced, which may cause a significant decrease in mass flow and a build up of pressure in the exhaust line upstream the VGT 100. By performing the calibration routine as described herein to detect the deflection point position, the working range of the VGT 100 can be adjusted to avoid the above described situation.

Similar effects may occur in alternative embodiments, wherein the vanes are rotatable to adjust the cross sectional area of the nozzle orifice. For example, the adjustable nozzle may comprise pivotable vanes, that are pivotable around an axis which is parallel to the axis of rotation of the rotor. By pivoting, e.g. opening and closing, the vanes, the mass flow of exhaust gas to the rotor can be adjusted. The nozzle actuator can be arranged for actuating, e.g. rotating, the vanes. When the vanes are rotated such that the gaps between the vanes are relatively narrow, a venturi is formed and the pressure in the mass flow of exhaust gas flowing through the gaps is reduced. As a result, a suction-effect is created between the vanes, which may cause the vanes to rotate further towards a more closed position, thereby decreasing the mass flow and increasing the pre-turbine pressure. By performing the calibration routine, the deflection point position at which this phenomenon occurs can be detected, and the above described effect can be avoided.

The nozzle actuator 140 shown here is a pneumatic actuator, comprising a piston 141, movable inside a piston chamber 142 and arranged for actuating the adjustable nozzle 130, via an actuation mechanism 148 comprising linkages. The piston chamber 142 can e.g. comprise a pressure inlet 143, e.g. arranged for receiving gas, such as air at a controlled pressure. The pneumatic actuator may further comprise a biasing element 144, such as a spring or diaphragm, mounted between the piston 141 and the piston chamber 142 and arranged for biasing the adjustable nozzle 130, e.g. towards the open or closed position. The actuator may further comprise a pressure generator 145, fluidly connected to the pressure inlet 143 and arranged for generating a pressure inside the piston chamber 142 to move the piston 141 by counteracting against the biasing element 144. The pressure generator can e.g. be a vacuum pump controlled by the controller 150 to generate a vacuum inside the piston chamber 142. Alternatively, the nozzle actuator 140 can be an hydraulic actuator, arranged for actuating the adjustable nozzle 130 using a pressurized fluid, such as water or oil. Alternatively, the nozzle actuator 140 can be an electric actuator, e.g. comprising an electric motor, e.g. a DC motor or a solenoid, optionally coupled to a transmission, to actuate the adjustable nozzle 130.

Preferably, the controller 150 is arranged for controlling the pneumatic actuator to adjust an actuation pressure based on the measured pre-turbine pressure P. For example, when the pre-turbine pressure is relatively high, the controller 150 may be arranged for controlling the pressure generator 145, such as a vacuum pump, to provide a stronger vacuum to actuate the adjustable nozzle 130.

In some embodiments of the VGT 100, e.g. as shown in FIG. 4, the intake channel 110 is arranged for providing the mass flow of exhaust gas to the rotor 120 in a direction substantially perpendicular to an axis of rotation of the rotor 120. As such, the rotor 120 can be used as a radial variant. Alternatively, when the rotor 120 is an axial variant, the intake channel 110 may be arranged for providing the mass flow of exhaust gas in a direction substantially parallel to the axis of rotation of the rotor 120.

The intake channel 110 may be formed as a volute that is coaxially aligned with the rotor 120. For example, the rotor 120 can be a radial variant and the intake channel can be formed as a volute, e.g. a curved funnel, with a center of curvature that is coaxially aligned with the axis of rotation of the rotor 120. The radius of curvature of the volute may e.g. decrease tangentially towards the rotor 120 to narrow the cross sectional area of the intake channel 110 along the direction of the flow, thereby accelerating the mass flow of exhaust gas fed to the rotor 120.

Figure 5:
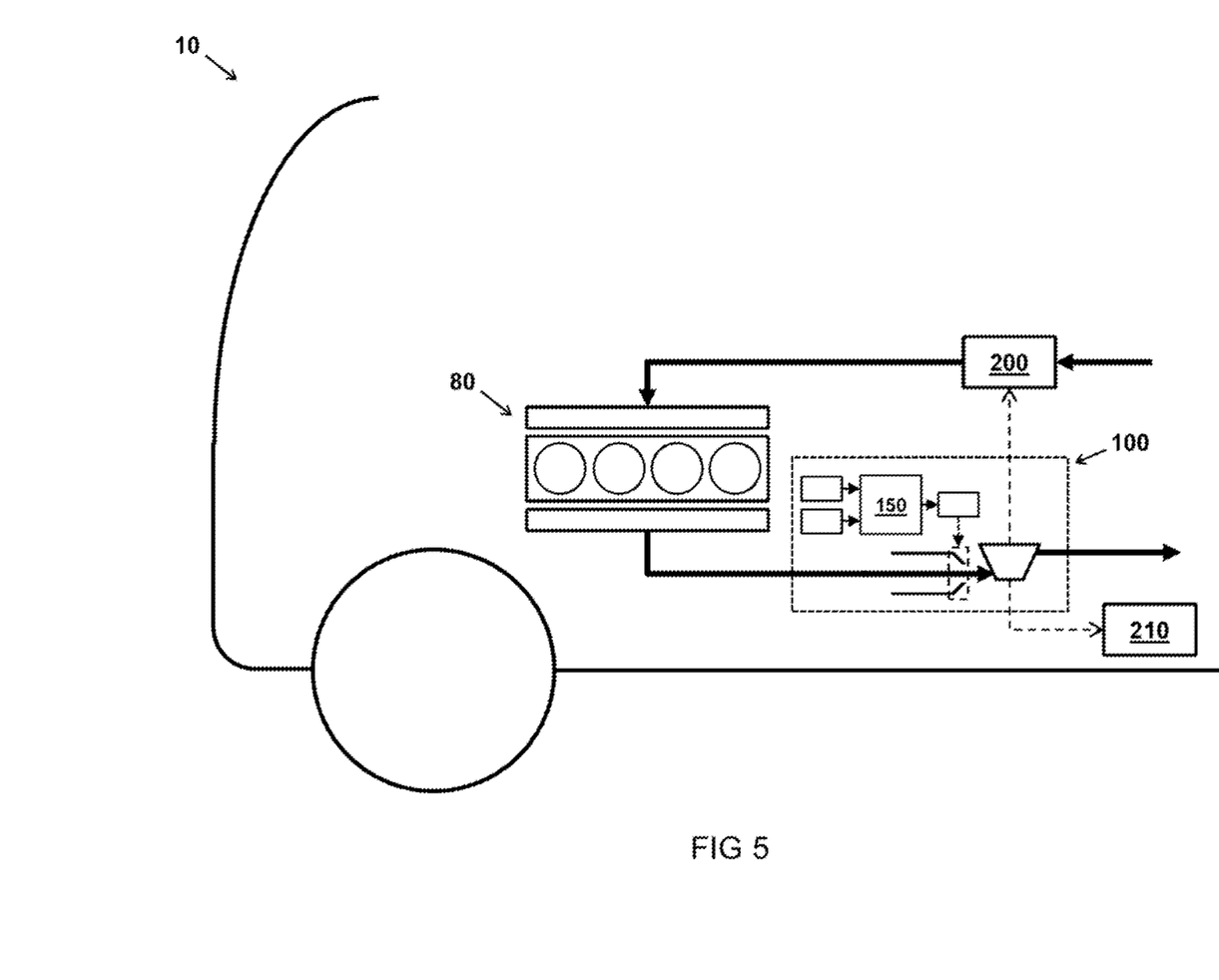
FIG. 5 illustrates a commercial vehicle, comprising the VGT.

In FIG. 5 is illustrated a commercial vehicle 10, e.g. a truck or a bus, comprising a VGT 100 as described herein. The VGT 100 can for example be arranged in the exhaust system of the internal combustion engine 80 powering the commercial vehicle, such as a diesel or spark ignition engine. The VGT 100 can for example be part of a turbocharger, wherein the VGT 100 e.g. mechanically powers a compressor 200, to convert energy recovered from exhaust gases into boost pressure.

Figure 6:
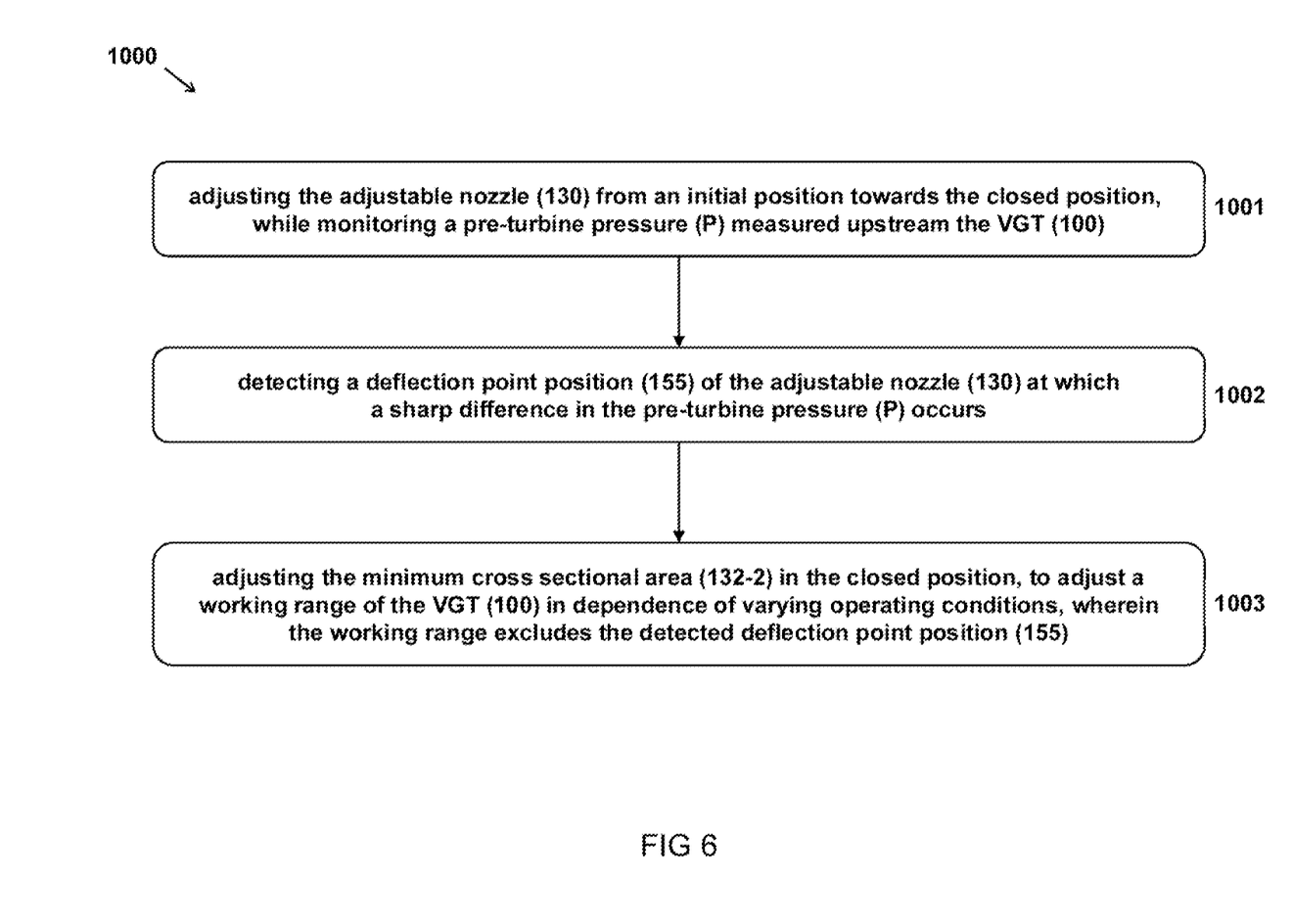
FIG. 6 represents a method for calibrating a VGT.

FIG. 6 provides a schematic representation of a method 1000 for calibrating a VGT 100, e.g. arranged in an exhaust system of an internal combustion engine. The VGT 100 comprises an intake channel 110, a rotor 120, and an adjustable nozzle 130. The intake channel 110 is arranged for receiving a mass flow of exhaust gas from the internal combustion engine. The rotor 120 is arranged downstream the intake channel 110 for extracting energy from the mass flow of exhaust gas. The adjustable nozzle 130 comprises a nozzle throat 131 having an adjustable cross sectional area 132 arranged for adjusting the mass flow of exhaust gas from the intake channel 110 to the rotor 120, wherein the adjustable nozzle 130 is adjustable between an open position, in which the nozzle throat 131 has a maximum cross sectional area 132-1, and a closed position, in which the nozzle throat 131 has a minimum cross sectional area 132-2.

As illustrated in FIG. 6, the method 1000 comprises step 1001 of adjusting the adjustable nozzle 130 from an initial position towards the closed position, while monitoring a pre-turbine pressure P measured upstream the VGT 100. The adjustable nozzle 130 can for example be adjusted manually or by an actuator, while the position of the adjustable nozzle is logged, e.g. as a function of time. The pre-turbine pressure P can for example be measured by a pressure sensor, e.g. arranged in an exhaust manifold or in an exhaust line between the internal combustion engine and the VGT 100. The measured pre-turbine pressure P can e.g. be logged as a function of time.

The method 1000 further comprises step 1002 of detecting a deflection point position 155 of the adjustable nozzle 130 at which a sharp difference in the pre-turbine pressure P occurs. The deflection point position 155 can for example be detected visually, by comparing the time-logged nozzle position and pre-turbine pressure, or can be detected computationally, e.g. by comparing a derivative of the pre-turbine pressure against a threshold value. For example, the deflection point position 155 can be defined when a first or second derivative of the pre-turbine pressure exceeds a threshold value.

Step 1003 of the method 1000 comprises adjusting the minimum cross sectional area 132-2 in the closed position, to adjust a working range of the VGT 100 in dependence of varying operating conditions, wherein the working range excludes the detected deflection point position 155.

It is thus believed that the operation and construction of the present invention will be apparent from the foregoing description and drawings appended thereto. For the purpose of clarity and a concise description features are described herein as part of the same or separate embodiments, however, it will be appreciated that the scope of the invention may include embodiments having combinations of all or some of the features described.

The invention applies not only to automotive applications where the variable geometry turbine is used for improved energy efficiency, but also to other technical, agricultural or industrial applications where a variable geometry turbine is used. It will be clear to the skilled person that the invention is not limited to any embodiment herein described and that modifications are possible which may be considered within the scope of the appended claims. Also kinematic inversions are considered inherently disclosed and can be within the scope of the invention. In the claims, any reference signs shall not be construed as limiting the claim.

The terms 'comprising' and 'including' when used in this description or the appended claims should not be construed in an exclusive or exhaustive sense but rather in an inclusive sense. Thus expression as 'including' or 'comprising' as used herein does not exclude the presence of other elements, additional structure or additional acts or steps in addition to those listed. Furthermore, the words 'a' and 'an' shall not be construed as limited to 'only one', but instead are used to mean 'at least one', and do not exclude a plurality. Features that are not specifically or explicitly described or claimed may additionally be included in the structure of the invention without departing from its scope.

Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. To the extent that structure, material, or acts are considered to be essential they are inexpressively indicated as such. Additions, deletions, and modifications within the purview of the skilled person may generally be made without departing from the scope of the invention, as determined by the claims.

The invention claimed is:

1. A variable geometry turbine (VGT), comprising:
    an intake channel, arranged for receiving a mass flow of exhaust gas from an internal combustion engine;
    a rotor, arranged downstream the intake channel for extracting energy from the mass flow of exhaust gas;
    an adjustable nozzle, comprising a nozzle orifice having an adjustable cross sectional area and arranged for adjusting the mass flow of exhaust gas from the intake channel to the rotor, wherein the adjustable nozzle is adjustable between an open position, in which the nozzle orifice has a maximum cross sectional area, and a closed position, in which the nozzle orifice has a minimum cross sectional area;
    a nozzle actuator, arranged for actuating the adjustable nozzle between the open position and the closed position; and
    a controller, arranged for controlling the nozzle actuator based on a nozzle position demand;
    wherein the controller comprises a calibration routine, arranged for calibrating the VGT during normal operation thereof;
    wherein, in the calibration routine, the controller is arranged for performing the steps of:
        adjusting the adjustable nozzle from an initial position towards the closed position, while monitoring a pre-turbine pressure measured in the mass flow of exhaust gas upstream the VGT;
        detecting a deflection point position of the adjustable nozzle at which a sharp difference in the pre-turbine pressure occurs; and
        adjusting a working range of the nozzle actuator, having an adjusted minimum cross sectional area in the closed position that excludes the detected deflection point position.

2. The variable geometry turbine according to claim 1, wherein the controller is arranged for comparing the detected deflection point position to a stored deflection point position of a pre-calibrated VGT, to determine a deflection point position offset, and wherein the controller is arranged for applying the deflection point position offset to the nozzle position demand.

3. The variable geometry turbine according to claim 1, wherein the controller is arranged for detecting the deflection point position by monitoring a second derivative of a filtered pre-turbine pressure sensor signal.

4. The variable geometry turbine according to claim 1, wherein the controller is arranged for controlling the nozzle actuator to adjust the adjustable nozzle based on the measured pre-turbine pressure.

5. The variable geometry turbine according claim 1, wherein the intake channel is arranged for providing the mass flow of exhaust gas to the rotor in a direction substantially perpendicular to an axis of rotation of the rotor.

6. The variable geometry turbine according to claim 1, wherein the intake channel is formed as a volute that is coaxially aligned with the rotor.

7. The variable geometry turbine according to claim 1, wherein the adjustable nozzle comprises vanes disposed around a circumference of the rotor.

8. The variable geometry turbine according claim 7, wherein the vanes are rotatable to adjust the cross sectional area of the nozzle orifice, and wherein the nozzle actuator is arranged for actuating the vanes.

9. The variable geometry turbine according to claim 7, further comprising a slidable cylinder which is slidable towards an opposing wall of the intake channel to adjust the cross sectional area of the nozzle orifice, and wherein the nozzle actuator is arranged for actuating the slidable cylinder.

10. A commercial vehicle, comprising a variable geometry turbine according to claim 1.

11. A method for calibrating a variable geometry turbine (VGT) comprising:
    an intake channel, arranged for receiving a mass flow of exhaust gas from an internal combustion engine;
    a rotor, arranged downstream the intake channel for extracting energy from the mass flow of exhaust gas;
    an adjustable nozzle, comprising a nozzle throat having an adjustable cross sectional area arranged for adjusting the mass flow of exhaust gas from the intake channel to the rotor, wherein the adjustable nozzle is adjustable between an open position, in which the nozzle throat has a maximum cross sectional area, and a closed position, in which the nozzle throat has a minimum cross sectional area;
    wherein the method comprises the steps of:
        adjusting the adjustable nozzle from an initial position towards the closed position, while monitoring a pre-turbine pressure measured upstream the VGT;
        detecting a deflection point position of the adjustable nozzle at which a sharp difference in the pre-turbine pressure occurs; and
        adjusting a working range of the nozzle actuator, having an adjusted minimum cross sectional area in the closed position that excludes the detected deflection point position.

* * * * *